March 1, 1960  K. GEBELE  2,926,579
PHOTOGRAPHIC CAMERA WITH INTERCHANGEABLE LENS
Filed Sept. 7, 1956  4 Sheets-Sheet 1
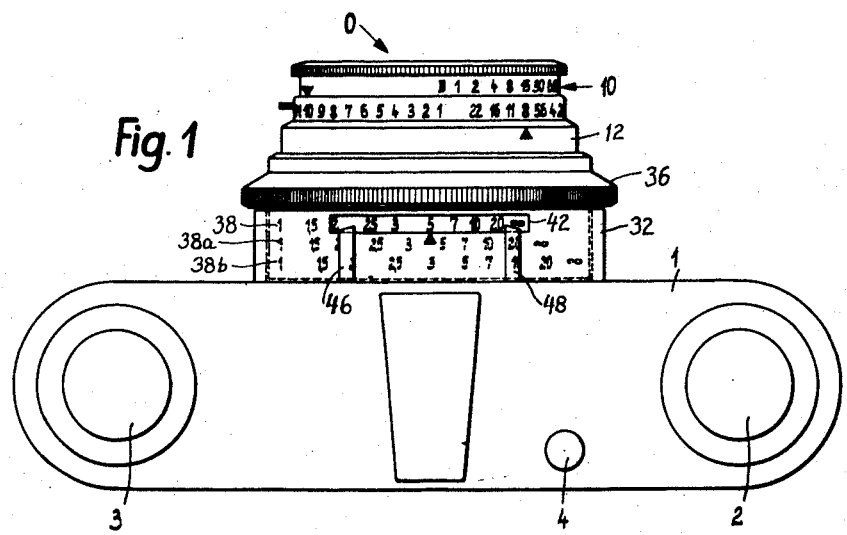
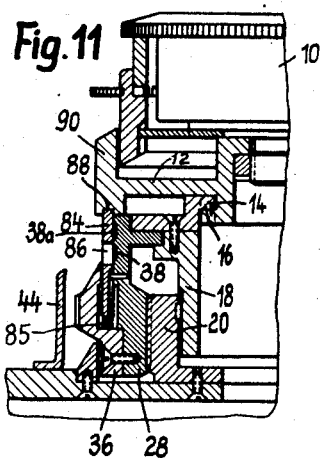
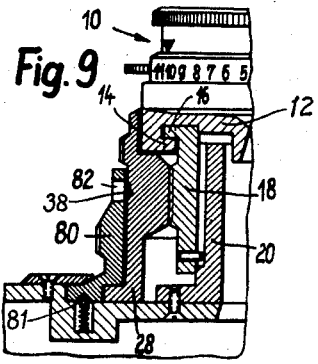
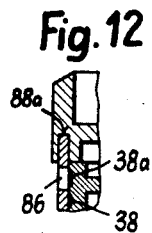
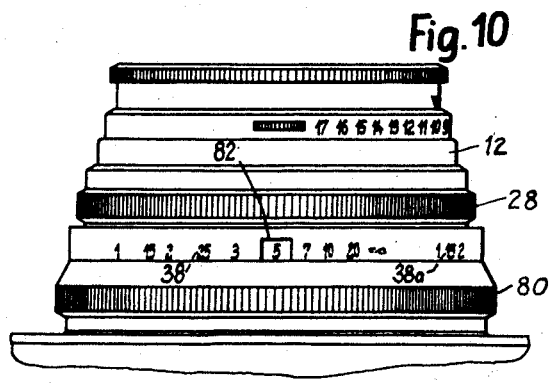

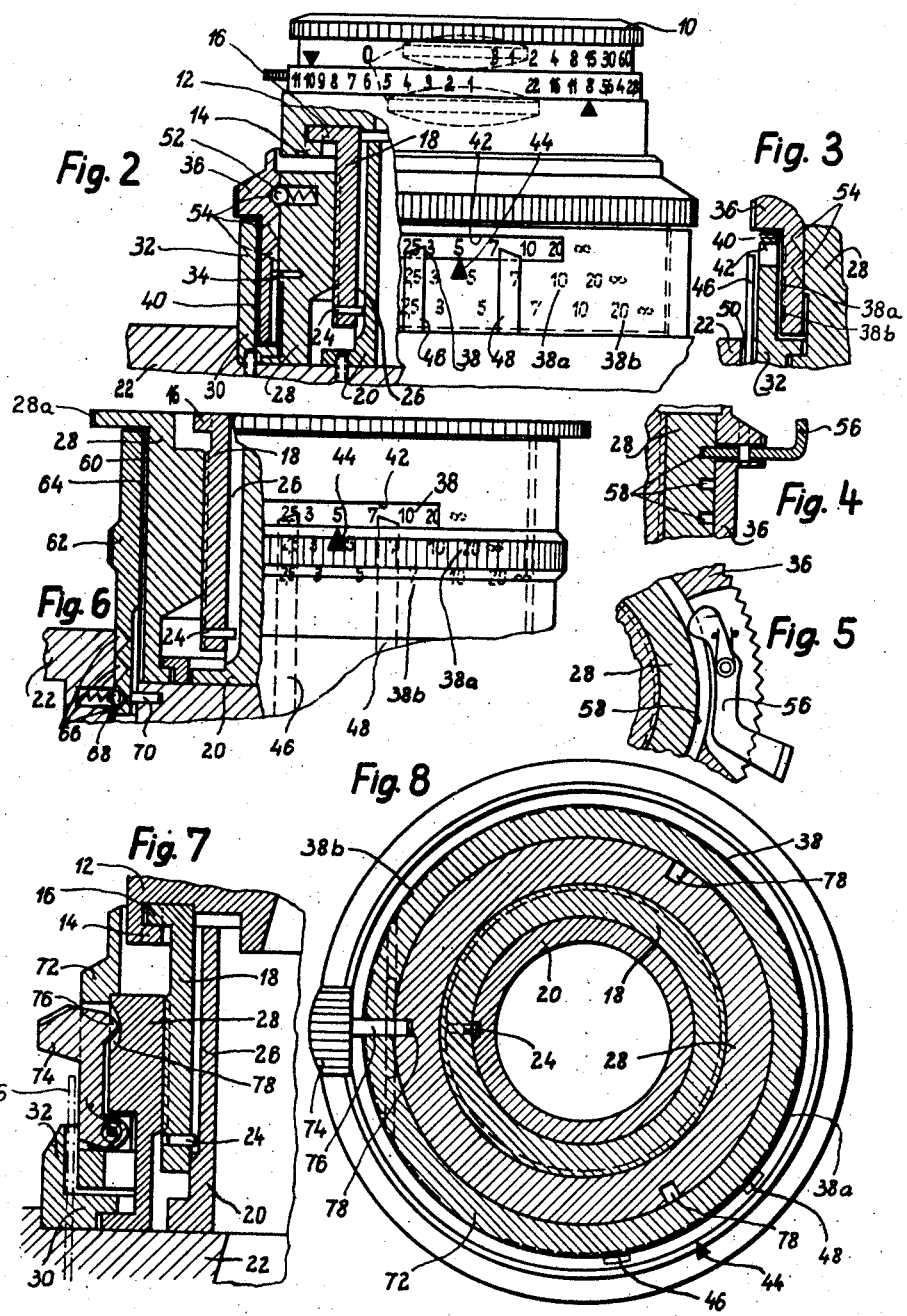

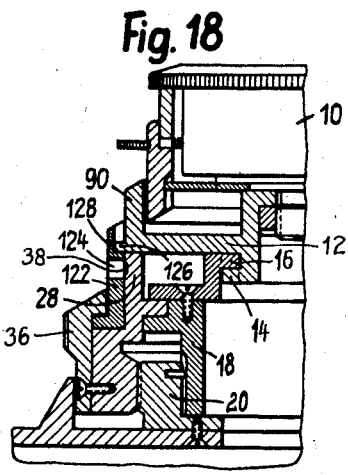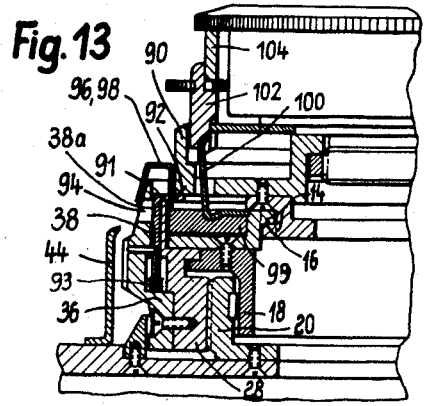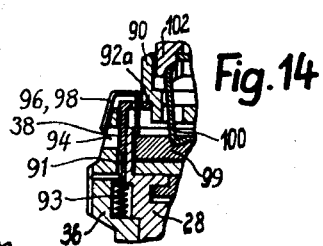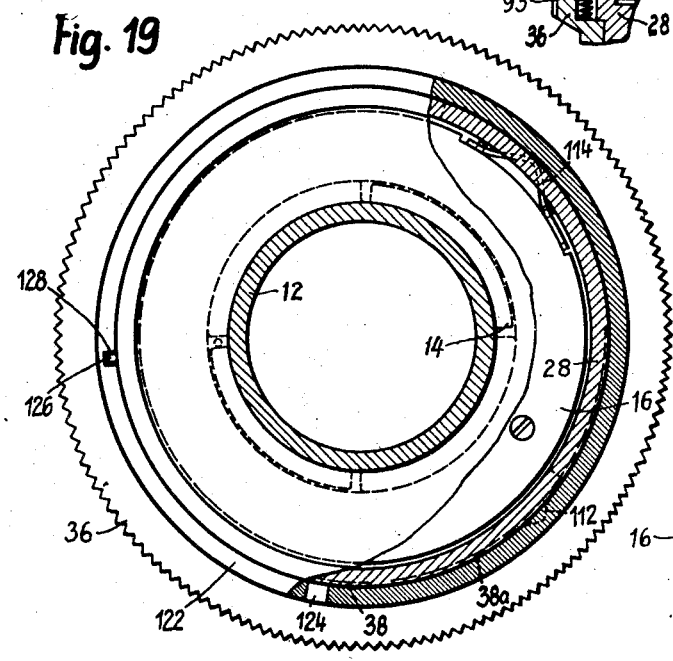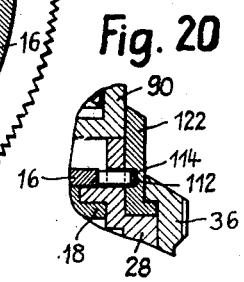

March 1, 1960  K. GEBELE  2,926,579
PHOTOGRAPHIC CAMERA WITH INTERCHANGEABLE LENS
Filed Sept. 7, 1956  4 Sheets-Sheet 4
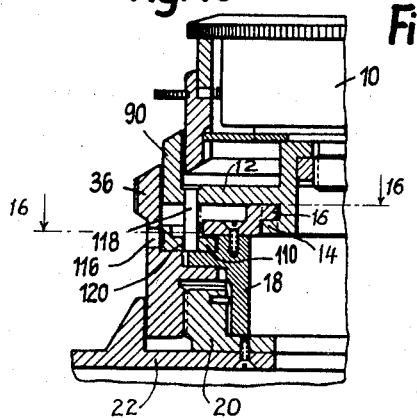
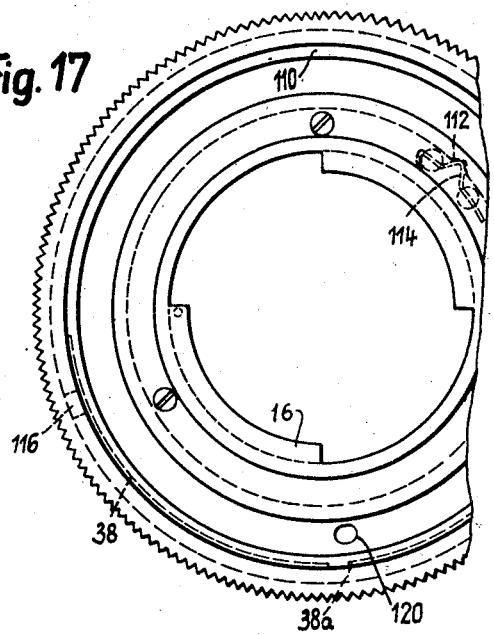
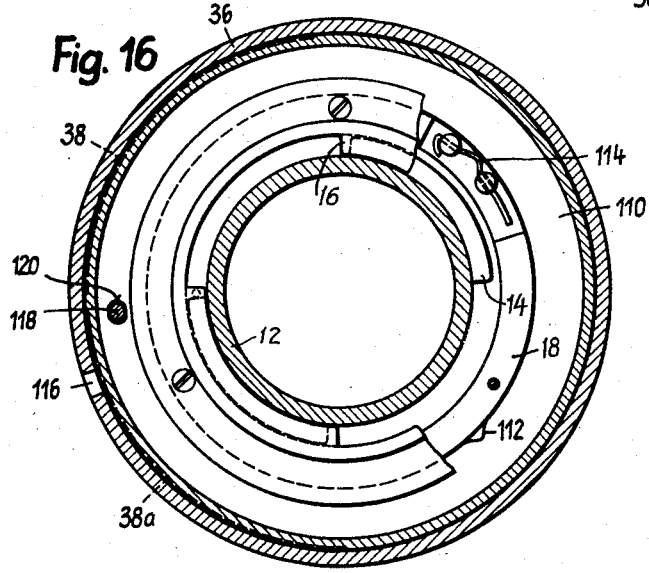

United States Patent Office 2,926,579
Patented Mar. 1, 1960

2,926,579

PHOTOGRAPHIC CAMERA WITH INTERCHANGEABLE LENS

Kurt Gebele, Munich, Germany, assignor, by mesne assignments, to Compur-Werk Friedrich Deckel OHG., Munich, Germany, a firm of Germany Application September 7, 1956, Serial No. 608,554

Claims priority, application Germany September 9, 1955

5 Claims. (Cl. 95—45)

This invention relates to a photographic camera having an interchangeable lens of the kind in which at least one component of the lens is movable in an axial direction for purposes of focusing.

One of the purposes of using interchangeable lenses is to be able to employ lenses of different focal length, with the same camera. When the lenses are of the focusing type, as is usually the case, rather than of the universal focus or fixed focus type, a focusing distance scale is employed, and this scale is ordinarily different for lenses of different focal length. If each separate interchangeable lens unit carries its own focusing distance scale, there is no problem of using the right scale with the right interchangeable lens.

However, it is frequently desirable to place the axial focusing adjustment mechanism on the camera body rather than incorporate this mechanism in each individual interchangeable lens unit. This placing of the focusing mechanism on the camera body obviates the need for and expense of duplicating in each interchangeable unit the high precision parts of the focusing mechanism. But when a single focus adjustment mechanism is used for a plurality of lens units, complications may arise from the fact that a plurality of focusing scales must be provided, one for use with each lens of different focal length. If a plurality of focusing scales are employed, there is the danger that, in the hurry of taking pictures in a limited time, the operator may accidentally read the wrong focusing scale; that is, he may read a focusing scale intended for use with another interchangeable lens unit rather than the particular interchangeable lens unit that is mounted on the camera at this particular time.

An object of the invention is the provision of an improved construction eliminating the danger of accidentally reading the wrong focusing distance scale, and insuring that the operator will read only the focusing scale appropriate for the particular interchangeable lens unit which is then mounted on the camera.

Another object of the invention is the provision of simple and inexpensive scale selecting means effective to confine the operator's attention to the proper one of a plurality of focusing distance scales intended for use with a plurality of different interchangeable lens units of a photographic camera.

Still another object is the provision of scale selecting means operated automatically by the act of placing the interchangeable lens unit on the camera, for selecting, from a plurality of available scales, the proper one of the scales which is intended for use with the particular interchangeable lens unit placed on the camera.

A further object is the provision of a generally improved and more satisfactory construction of focusing scale means for use with interchangeable lens means.

These and other desirable objects may be attained in the manner disclosed as an illustrative embodiment of the invention in the following description and in the accompanying drawings forming a part hereof, in which:

Fig. 1 is a top plan view of a photographic camera equipped with an interchangeable lens unit, showing the general type of construction to which the present invention pertains;

Fig. 2 is a top plan view of a fragment of a camera and focus adjustment means and interchangeable lens unit, with parts broken away and parts in radial section, illustrating a first embodiment of the invention;

Fig. 3 is a view similar to a fragment of Fig. 2, taken on a different radial plane and illustrating different details of the same embodiment;

Fig. 4 is a fragmentary radial section illustrating a second embodiment of the invention;

Fig. 5 is a transverse section through the parts shown in Fig. 4;

Fig. 6 is a view similar in general to Fig. 2, illustrating a third embodiment of the invention;

Fig. 7 is a view similar to a portion of Fig. 6, illustrating a fourth embodiment of the invention;

Fig. 8 is a transverse section through the embodiment illustrated in Fig. 7;

Fig. 9 is a fragmentary view similar to the left hand portion of Fig. 2, illustrating a fifth embodiment of the invention;

Fig. 10 is a side view of the embodiment shown in Fig. 9;

Fig. 11 is a fragmentary radial section similar to the left hand portion of Fig. 2, illustrating a sixth embodiment of the invention, when used with one interchangeable lens unit;

Fig. 12 is a view similar to a fragment of Fig. 11 illustrating the same construction when a different interchangeable lens unit is employed;

Fig. 13 is a fragmentary radial section similar in general to Figs. 9 and 11, but illustrating still another embodiment of the invention, with one interchangeable lens unit employed;

Fig. 14 is a view similar to a fragment of Fig. 13, showing the same embodiment with a different interchangeable lens unit;

Fig. 15 is a view similar to Figs. 9, 11, and 13, illustrating still another embodiment of the invention;

Fig. 16 is a transverse section taken approximately on the line 16—16 of Fig. 15;

Fig. 17 is a front face view of the rear unit or focusing mount unit illustrated in Fig. 15, with the interchangeable lens unit removed;

Fig. 18 is another view similar to Figs. 9, 11, 13, and 15, illustrating a different embodiment of the invention;

Fig. 19 is a view partly in transverse section and partly in front elevation, of the mechanism shown in Fig. 18; and Fig. 20 is a fragmentary radial section taken through the construction shown in Figs. 18 and 19.

The same reference numerals throughout the several views indicate the same parts.

Referring now to Fig. 1, there is shown a typical camera of the kind with which the present invention is useful. For instance, the camera includes a main body 1 having a film winding or advancing knob 2 and a film rewinding knob 3, and a shutter release or trip 4 on the top wall. Mounted on the front wall of the camera and alined with the optical axis of the camera, there is an interchangeable lens unit O which may or may not include an objective shutter 10. The interchangeable lens unit is detachably mountable on and removable from a second unit rearwardly of and in optical alinement with the front or detachable lens unit, which second unit may be mounted either permanently or detachably on the front wall of the camera. The shutter itself may be mounted in any desired place, either as part of the front detachable unit or as part of the second unit above mentioned, or indeed it may be in a position rearwardly of the second unit, since the details of the shutter and the position which it occupies are not important for purposes of the present invention, at least in its broader aspects.

At least one of the lenses of the first of detachable and interchangeable lens unit is movable forwardly and backwardly along the optical axis, for purposes of focusing the camera. The mechanism for producing the axial focusing movement is not incorporated in the interchangeable lens unit itself, but is incorporated in the second unit above mentioned, in order that the same focusing mechanism may be employed with several different interchangeable lens units, thus avoiding the expense of duplicating the focusing mechanism in each separate lens unit. For instance, referring now to Figs. 2 and 3, the interchangeable lens unit may have an annular ring shaped body 12 provided at its rear with bayonet projections or lugs 14 for mating in the usual manner with a bayonet ring 16 formed at the front end of a carrying tube 18 which slides forwardly and rearwardly along the optical axis on the outside of a stationary guide tube 20 fixed to the front wall 22 of the camera. A pin 24 fixed to the tube 18 enters an axially extending slot 26 in the stationary tube 20, to prevent the tube 18 from turning.

The tube 18 is externally threaded, and engages internal threads on a focusing nut 28 which may be turned in any suitable manner for focusing purposes and which is held against axial movement by any suitable means such as a stationary flange 30 of a bushing 32 mounted stationarily on the front wall 22 of the camera, which flange 30 overlies a flange of the nut 28, as shown.

Various means may be employed for turning the threaded sleeve or nut 28 when it is desired to focus the camera. In the first embodiment of the invention as illustrated in Figs. 2 and 3, turning is accomplished by means of an external focusing ring 36 having a circumferentially extending knurled rib for easy grasping by the operator's fingers, which ring 36 surrounds the member 28 and is axially movable thereon but non-rotatably connected thereto by means of a pin 34 projecting radially from the member 28 and extending into an axially extending slot in the inner face of the focusing ring 36. Upon turning the ring 36, the nut member 28 turns with it, thereby moving the carrier tube 18 axially forwardly or backwardly, as the case may be, thus producing corresponding axial movement of the front or interchangeable unit 10, 12, 14 for focusing purposes. The parts 18, 20, 28, and 36 comprise the rear unit, from which the front or interchangeable lens unit is detachably removable, and it is noted that all the focusing mechanism parts which require high precision in manufacture are located in this rear unit, which thus serves to focus any desired number of different interchangeable lens units, which themselves require no focusing mechanism parts.

A plurality of focusing distance scales are provided, differing from each other to the extent required by the different optical characteristics (e.g., focal length) of the various interchangeable lens units which are intended to be used with this particular camera. According to the present invention, means is provided for visually selecting or designating or rendering visible only the one focusing scale which is intended to be used at any particular time, the other scale or scales being preferably blocked off to prevent possible confusion of the operator under the stress of taking pictures in a hurry.

In this first embodiment of the invention, all of the focusing distance scales are marked peripherally on the outer face 40 of the member 36, but are offset or spaced from each other in an axial direction. The first focusing scale is shown at 38, another focusing scale 38a is offset axially rearwardly from it, and still another focusing scale 38b is offset axially still further in a rearward direction. The scales are marked, as usual, in appropriate units of distance, e.g., feet or yards or meters. The stationary bushing 32 surounds and covers the face 40 which carries the scales, and only one scale at a time is visible through a peripheral slot 42 formed in the bushing 32 and constituting a scale observation window or sight window, the graduations of the scale being read in conjunction with a reference point or index mark 44 formed on the outer face of the bushing 32.

As already mentioned, the focus adjusting member 36 is axially movable on the nut member 28, and is suitably held in any axial postion in which it may be set, as for example by means of one or several spring pressed balls 52 mounted on the member 28 and engaging one or another of various grooves or notches or recesses 54 on the inner face of the member 36. When the member 36 is in its rearmost position, with the detents 52 engaged in the front groove 54, only the first focusing scale 38 is visible through the observation window 42.

If the camera is now to be used with a different interchangeable lens unit, for which the second focusing scale 38a is appropriate rather than the first scale, the member 36 is moved axially forwardly by hand, until the detent 52 becomes seated in the second or middle groove 54. This brings the first focusing scale 38 out of alinement with the observation window 42, and moves the second focusing scale 38a into alinement with the observation window. Similarly, if the device is to be used with still another interchangeable lens unit for which the third focusing scale 38b would be appropriate, the member 36 is moved still further forwardly in an axial direction, until the detent 52 engages into the rearmost one of the grooves 54, in which position the third focusing scale 38b will be visible through the window 42.

In this embodiment of the invention, the axial displacement of the member 36, to bring the proper one of the focusing scales into alinement with the observation window 42, is effected by hand, the operator choosing the particular scale appropriate for the particular interchangeable lens unit which the operator mounts on the camera, and adjusting the member 36 accordingly, at the time that the lens unit is placed on the camera. To facilitate the manipulation and reduce the possibility of any error in choosing the wrong scale, the various scales may be provided with identifying numbers or letters which correspond with numbers or letters marked on the various interchangeable lens units, or which represent the focal length for which the focusing scales are intended. Or again, each of the separate focusing scales may be marked in a different color, corresponding to a colored dot or other colored indication on the interchangeable lens unit.

A depth of field indicator may be employed if desired, the pointers of which are shown at 46 and 48 in Fig. 2, and which extend out through a suitable slot 50 as shown in Fig. 3, so that these pointers move over the outside of the window 42 and show, with reference to the particular focusing scale appearing through the window, the maximum and minimum distances within which objects in the field of view will be sharply focused on the film, for any particular setting of the focusing mechanism and any particular setting of the usual iris diaphragm customarily employed. The means for moving the depth of field pointers 46 and 48 from the adjusting movements of the iris diaphragm are not important for purposes of the present invention, and are not shown or described in detail herein, but may be, for example, of substantially the same form disclosed in the copending U.S. patent applications of Franz Singer, Serial No. 555,964, filed December 28, 1955, and Kurt Gebele, Serial No. 557,183, filed January 3, 1956, both owned by the assignee of this present application. If the iris diaphragm happens to be mounted in the interchangeable lens unit rather than in the second unit, the iris diaphragm adjusting means may be detachably coupled to the depth of field indicating mechanism by the coupling means disclosed, for example, in the U.S. patent app'ication of Kurt Gebele, Serial No. 608,538, filed September 7, 1956.

A second embodiment of the invention (Figs. 4 and 5) is the same as the first embodiment above described, except that a positive latch is employed for holding the member 36 there is pivotally mounted a two-armed latch-spring pressed detent 52. In a peripheral notch in the member 36 there is pivotally mounted a two-armed latching lever 56 having an outer end or tail which projects outwardly to an accessible position, and an inner end or nose urged inwardly by a spring so as to tend to remain in one or another of the grooves 58 formed in axially spaced locations in the member 28. When the operator's fingers grasp the ring 36, one finger can be brought against the projecting tail of the latching lever 56 so as to release the latch and thus permit the member 36 to be moved axially forwardly or rearwardly until the latching lever engages a different one of the notches 58.

A third embodiment of the invention, shown in Fig. 6, is substantially the same as the first embodiment shown in Figs. 2 and 3, except that in the third embodiment it is the scale masking member, with the observation window, which is moved axially forwardly or rearwardly, rather than the member on which the scales are mounted.

In this embodiment, the scales 38, 38a, and 38b are marked in axially spaced relation to each other on the outer face 60 of the nut member 28, which is turned for focus adjustment purposes by the knurled ring 28a formed integrally with the nut 28 and projecting outwardly to an accessible external position at the front end of the nut.

The tubular masking member 62 surrounds the nut 28 and serves to mask the focusing scales on the nut, except for the scale visible through the observation window 42 formed in the member 62. The masking sleeve 62 is axially movable relative to the camera body and the nut 28, and is held in any desired position of axial adjustment by means such as the spring pressed detent ball 68 engaging in one or another of the grooves or notches 66 formed at axially spaced intervals in the member 62, which member is held against rotation relative to the camera body by a fixed pin 70 engaging in an axially extending slot in the inner face of the member 62. When the masking member 62 is moved axially, the desired one of the focusing scales 38, 38a, and 38b becomes visible through the window 42 and is read in conjunction with the fixed index mark 44, while the other focusing scales are covered and rendered invisible. The depth of field indicating pointers 46 and 48 work in the annular space 64 between the members 28 and 62. The other parts of this embodiment are the same as in the first embodiment.

A fourth embodiment of the invention is illustrated in Figs. 7 and 8. In this embodiment, as well as in other embodiments subsequently described, many of the parts are similar to corresponding parts of previously described embodiments and will be sufficiently understood merely from their identification by the same reference numerals used in connection with the previous embodiments, no additional description of such parts being needed. However, in this fourth embodiment, the focusing distance scales are selectively brought into effective reading position by a turning movement or rotary movement about the optical axis of the structure as a center, rather than by a movement in an axial direction as was the case in the earlier embodiments.

In this construction, the focusing nut or ring 28 is surrounded by an external setting ring 72 which is fixed against axial movement but which is rotatable on the nut 28 except when latched to the nut by means of a spring biased latching member 74 pivotally mounted on the member 72 and having a nose 76 engageable in one or another of the notches 78 formed in the nut 28 at various intervals notched circumferentially from each other. The various focusing scales 38, 38a, and 38b are arranged on the outer face of the member 72, and are spaced from each other in a circumferential direction rather than in an axial direction. The scale which is to be used or read at any particular moment is the scale which is opposite the index pointer or reference mark 44 marked on the stationary sleeve 32, and which is opposite the depth of field indicating pointers 46 and 48. Turning movement is imparted to the nut 28, for focusing purposes, by turning the external ring 72 while it is latched to the nut. To bring a different one of the focusing scales into reading position, the nose 76 of the latch 74 is pulled out of the notch 78, against the force of its spring, and the member 72 is rotated until the appropriate focusing scale is opposite the pointer 44, whereupon the latch 74 is latched into the appropriate one of the notches 78, so that the setting ring 72 is again coupled to the focusing nut 28 to turn therewith.

A fifth embodiment of the invention is illustrated in Figs. 9 and 10. This, like the fourth embodiment, selects the proper focusing scale by means of a turning or rotary movement rather than an axial movement of the parts. The respective focusing scales 38, 38a, and 38b are marked on the outer face of the focus adjusting nut 28, and are staggered or spaced from each other in a circumferential direction rather than in an axial direction. A masking member or shutter member 80 surrounds that part of the nut 28 which carries the scales, and hides all of the scales except such parts thereof as may be visible through the sight window 82, which serves also as the index mark or pointer for reading any selected one of the scales. The masking member 80 is rotatable to bring the sight window 82 opposite the desired one of the focusing scales, and is held in the proper position by means of a spring pressed detent 81 which engages a notch or recess in the member 80 at each of the various positions in which the member 80 may be properly set.

In the embodiments thus far described, the adjustment of the setting ring or other adjustable parts for determining which focusing scale is to be used, is in each case effected by hand. There will now be described certain other embodiments of the invention in which the adjustment for determining which focusing scale to use is effected automatically by the movement of the interchangeable lens unit when placing the same on the camera. In this connection, it should be borne in mind that when an interchangeable lens unit is to be attached to the camera by the usual bayonet mounting, there are really two movements performed during the attaching process, first an axial movement of the interchangeable lens unit toward the camera, while the parts are properly alined with each other on the optical axis, and second, a rotary movement through a fraction of a revolution, to engage the respective bayonet lugs on the first unit with those on the camera or second unit, at the conclusion of the axial bringing together of the parts. According to the present invention, either the axial movement or the rotary movement of the interchangeable lens can be used for automatic setting of the scale selecting means. There will be described below certain embodiments of the invention which utilize the axial movement for selecting the proper focusing scale, and other embodiments which utilize the rotary movement of the interchangeable lens unit for selecting the proper focusing scale, all in an automatic manner which does not require special attention or manipulation by the operator.

A construction in which the axial mounting movement of the interchangeable lens serves to select the proper focusing scale, will now be described in connection with Figs. 11 and 12. The axially movable carrier tube 18 of the rear unit is here placed inside the stationary guide tube 20 rather than outside, and the focusing nut 28 travels axially forwardly or rearwardly as it turns on its screw threads on the outside of the stationary guide tube 20. The axial movement of the nut is transmitted to the tube 18 by means of an internal radially extending flange on the nut 28 which engages in a groove formed between the member 18 and the bayonet connection flange 16 fixed to the front of the tube 18.

There are a plurality of focusing scales marked on the external periphery of the nut 28 in axially spaced or offset relation to each other, two such focusing scales being here shown at 38 and 38a. A masking ring or scale selecting ring 84 surrounds that part of the nut 28 which bears the scales, and has a circumferentially elongated sight window 86 through which one of the scales may be read in conjunction with a stationary pointer 44 fixed to the stationary front wall of the camera.

The masking or scale selecting ring 84 is mounted for a limited extent of axial movement relative to the nut 28, but is prevented from rotation relative to the nut by means of a pin on the nut engaging an axial slot in the inner face of the ring 84. Light springs 85 push axially forwardly on the ring 84 and tend to keep the front edge thereof seated in an annular groove 88 formed on the rear face of the bayonet connection member 90 which is part of the interchangeable lens unit. Thus when an interchangeable lens unit is in place, the axial position of the shutter 84 will depend on the depth of the groove 88 the bottom of which groove constitutes an abutment surface for determining the axial position of the ring 84. When this groove 88 is relatively shallow, as in Fig. 11, the ring 84 will be held in a relatively rearward position, and when this groove is deeper, as at 88a in Fig. 12, the ring 84 will occupy a position farther forwardly in an axial direction.

The axial engaging motion of the interchangeable lens unit, when it is being placed on the camera, pushes the scale selecting ring 84 axially rearwardly against the force of its springs 85, to an extent determined by the depth of the groove 88 or 88a. When the lens unit has a shallow groove, the sight window 86 lies opposite the rear one of the focus adjusting scales 38, so long as this particular interchangeable lens unit remains mounted on the camera. When this lens unit is detached and replaced by a different interchangeable lens unit having a deeper groove such as shown at 88a in Fig. 12, the scale selecting ring 84 occupies a position farther forwardly, so that the sight window 86 will now be opposite the forward focusing scale 38a instead of the rear focusing scale 38.

The embodiment shown in Figs. 13 and 14 involves substantially the same principles, except that the axial attaching motion of the interchangeable lens unit now controls the axial position of a ring which carries the focusing scales themselves, rather than the axial position of a masking ring or obstructing ring as in the previous embodiment. The focusing scales 38 and 38a are here marked on a ring 91 which, like the ring 84 in Fig. 11, is mounted on the nut 28 for limited axial movement relative to the nut, but is held against turning relative to the nut. Light springs 93 push the rear edge of the ring 91 forwardly until a flange at the front of the ring 91 comes into contact with an abutment shoulder 92 or 92a formed on the part 90 of the interchangeable lens unit, the position of this abutment shoulder being different on different lens units, so as to vary the axial position of the ring 91 in a manner dependent upon the identity of the particular interchangeable lens unit which is mounted on the camera. In this way, one or another of the focusing scales 38 and 38a is brought opposite the sight window 94 formed in the part 36 fixed to the nut 28, so that the scale which is opposite this sight window may be read in connection with the reference point or index mark 44 mounted stationarily on the camera.

In Fig. 13, there is shown an interchangeable lens unit in which the abutment shoulder 92 is relatively far rearwardly, in comparison to the more forward position of the abutment shoulder 92a in Fig. 14. Hence when the interchangeable lens unit of Fig. 13 is mounted on the camera, the ring 91 will be held further rearwardly and the front one of the focus adjustment scales 38a will be visible through the window 94. When this unit is replaced by the other interchangeable lens unit shown in Fig. 14, the ring 91 will lie farther forwardly and the rear one of the focus adjusting scales 38 will then appear through the window 94.

If it is desired to use a depth of field indicator in connection with this focusing scale construction, it may be done. The depth of field pointers are shown at 96 and 98, and are bent around the front edge of the member 36 so that the pointers may be read in conjunction with the scale appearing through the window 94. The pointers 96 and 98 are driven oppositely in a circumferential direction, toward or away from each other, by driving mechanism indicated diagrammatically at 99, which driving mechanism in turn is moved by a resilient coupling tongue 100 which extends forwardly through an arcuate slot in the member 90 and engages a coupling notch in the diaphragm aperture setting ring 102 of the interchangeable lens unit. The diaphragm aperture setting ring 102, in turn, may be coupled in a number of different positions of relative orientation to the shutter speed setting ring 104 of a shutter incorporated in the interchangeable lens unit, so that, in known manner, when a given exposure value is set, the shutter speed adjustment and the diaphragm aperture adjustment are thereafter coupled (until the setting is changed) to move together as a unit to vary the shutter speed and the diaphragm aperture in a complementary manner without affecting the exposure value. The coupling of shutter speed to diaphragm aperture, and the coupling of the diaphragm aperture setting means to the depth of field indicating means, may be as disclosed, for example, in the above mentioned application of Kurt Gebele, Serial No. 608,538, the exact details thereof being not important so far as the present invention is concerned.

Referring now to an embodiment in which the turning or twisting motion of placing the interchangeable lens unit on the camera, is used to select the proper focusing scale, reference is made to the construction shown in Figs. 15, 16, and 17. The nut 36 rides on external screw threads on the stationary guide tube 20, and the turning movement of the nut 36 serves to impart axial focusing movement, but not rotary movement, to the carrier tube 18 which, at its forward end, is provided with the bayonet lugs for engaging the mating bayonet lugs of the part 90 of the interchangeable lens unit. The separate focusing scales 38 and 38a are marked in circumferentially spaced positions on a graduated ring 110 rotatably mounted on the nut 36 in such position that the necessary part of one focusing scale or the other can be seen through the sight window 116 in the nut 36, depending on the position to which the ring 110 is turned.

In what may be called a normal position of the graduated ring 110 relative to the non-rotatable but axially movable carrier tube 18, a notch 112 in the ring 110 is engaged by a spring detent 114 mounted on the tube 18, to hold the ring 110 frictionally in the normal position, where the first focusing scale 36 is opposite the sight window 116. If, however, the graduated ring 110 is turned a substantial distance from this normal position, the other focusing scale 38a will be brought opposite the sight window 116.

This turning of the ring 110 to bring one or the other scale opposite the sight window 116, is accomplished by the turning movement of the interchangeable lens unit when the latter is placed on the camera. To produce this movement, one of the interchangeable lens units will have a driving pin 118 fixed to the part 90 of the unit and extending rearwardly so as to engage in an opening 120 in the ring 110 as the interchangeable unit completes the axial part of its mounting movement onto the camera. Then as the interchangeable unit undergoes its turning or twisting movement relative to the camera, at the completion of its axial movement, the engagement of the pin 118 in the opening 120 will drive the scale ring 110 in a rotary direction, to move it from its normal position to the second position shown, for example, in Fig. 16, wherein the other focusing scale 38a will be opposite the sight window 116, this being the focusing scale which should be used with the interchangeable lens unit equipped with the pin 118. When this unit which is equipped with the pin 118 is twisted reversely to remove it from the camera, it will, of course, restore the ring 110 to its normal position. Another interchangeable lens unit, which should be used with the focusing scale 38, will not be equipped with this pin 118, so that when this other lens unit is mounted on the camera, it will cause no twisting of the scale ring 110 from its initial or normal position, and therefore the focusing scale 38 will remain opposite the sight window 116.

Finally, in Figs. 18, 19, and 20, there is shown another construction in which the turning or twisting movement of the interchangeable lens unit controls the selection of the focusing scale which is to be used, but in which the turning is transmitted to a cover ring or masking ring rather than to a ring which carries the focusing scale. In this embodiment, the focusing scales 38 and 38a are marked in circumferentially spaced position on a suitable peripheral surface of the nut 28, one scale or the other being selectively visible through a sight window 124 formed in a masking ring or cover ring 122 which surrounds the part of the nut 28 which carries the focusing scales. This ring 122 has an internal notch 112 engaged by a spring detent 114 mounted on the carrier tube 18 and extending out through a suitable slot in the nut 28 so as to engage the notch 112 in the ring 122 and tend to hold it in a normal position in which the sight window 124 is opposite one of the scales.

One of the interchangeable lens units is provided with a projection 126 which, during the axial part of the mounting movement of the interchangeable lens unit, enters into an axial slot 128 at the front edge of the cover ring 122. Then during the rotary or turning part of the mounting movement of the lens unit, the projection 126 turns the ring 122 so as to bring the sight opening 124 opposite the other focusing scale, e.g., the scale 38. When this interchangeable lens unit is removed, the reverse rotation thereof will carry the ring 122 back to its normal position so that the spring detent 114 will snap again into the recess 112, and the sight window will be opposite the scale 38a. The other interchangeable lens unit does not have the projection 126, so when it is applied to the camera, it does not cause any rotation of the ring 122, and the ring remains in its initial or normal position, with the sight window 124 opposite the other focusing scale 38a.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied wtihin the scope of the appended claims. From the structures above disclosed and the explanations given, it is apparent that the skilled artisan will be able to make many variations in structural details, to accommodate interchangeable lens units of various different forms and styles, while still embodying the herein disclosed principles of selecting or indicating the particular focusing scale to be used from a plurality of such scales, either by a hand manipulation or by utilizing one or another of the motions of placing the interchangeable lens unit on the camera. Thus the quick and easy use of the camera is facilitated. This selection or designation of the proper focusing scale is accomplished in an automatic and fool-proof manner, in those embodiments wherein the mounting motion of the interchangeable lens unit is employed for selecting or indicating the particular focusing scale which is to be used with that particular lens unit.

To emphasize the generic unity of all the described specific embodiments of the invention, and to explain the generic language used in the claims, it may be pointed out that in all of the embodiments described, the construction may be said to include a scale member on which a plurality of different focusing scales are marked, the scale member being operatively connected to the axially movable focusing part to move when such part moves, and a second member which constitutes designating means for designating a particular one of the focusing scales which is to be used under given circumstances, one of these two members being adjustably movable relative to the other of these two members, independently of focusing movement, in order to designate the particular focusing scale desired. In some of the embodiments (Figs. 2-10) the operative connection between the scale member and the axially movable mounting part is through screw threads, and during the axial focusing movements of the mounting part the scale member rotates about the optical axis but does not move in an axial direction. In other embodiments (Figs. 11-14 and 18-20) the scale member moves both axially and rotationally during axial focusing movements of the mounting part, while in one embodiment (Figs. 15-17) the scale member moves only axially and not rotationally, during focusing movements.

The above mentioned "second member" constitutes, in most cases, a masking or obstructing member which overlies the focusing scale nad renders visible, through an observation window, all or a necessary part of the particular focusing scale which is to be used (Figs. 2-6 and 9-20) and in some of these cases just mentioned, the "second member" remains rotationally stationary during focusing movements (Figs. 2-6, 9, 10 and 18-20) while in the remainder of these cases the second member rotates during the focusing movements (Figs. 11-17). But in the embodiment of Figs. 7-8, the "second member" is the index mark 44 on the stationary ring 30, 32 fixed to the front wall of the camera. The mark 44 and the ring 32 do not overlie or mask any of the focusing scales, but the mark 44 nevertheless serves to point out or designate the particular focusing scale which is to be used, i.e., the scale which lies opposite the mark 44.

As for the statement that one of the two members (scale member and second member) is movable or adjustable relative to the other member, independently of focusing movement, in order to designate the desired focusing scale, this is obviously true of all disclosed embodiments of the invention. In Figs. 2-5, 7-8, and 13-17, it is the scale member which is moved in order to change the designation of which scale is to be used, while in Figs. 6, 9-12, and 18-20, it is the second member which is moved to change the scale designation, but in all cases there is a relative movement of one of these two members with respect to the other, and in all cases this relative movement for changing the scale designation is independent of the focusing movement and does not alter the position, in an axial direction, of the interchangeable lens mount unit.

In most instances, the "second member" not only constitutes the means for designating which particular focusing scale is to be used, but also constitutes or carries the index mark or reference pointer used for reading the designated scale (e.g., Figs. 2-10 and 15-20). This is not necessarily the case, however, because Figs. 11-14 show constructions in which the "second member" 84, 86, or 34, 94 serves to designate the particular focusing scale to be used but without providing a reference point or index for reading the scale, while the necessary reference point is provided by a separate stationary pointer 44.

What is claimed is:

1. A photographic camera including focus adjusting means having an optical axis and a carrier tube surrounding said optical axis and movable forwardly and rearwardly in the direction of said optical axis for focusing, an interchangeable lens mount unit engageable with and disengageable from said carrier tube and movable axially therewith, a manually movable focus adjusting ring rotatable about said optical axis as a center, a focus scale tube encircling said optical axis and arranged coaxially with said adjusting ring and movable axially with respect to said adjusting ring, spring means urging said scale tube axially in one direction, a plurality of focus distance scales each marked circumferentially on said scale tube and offset from each other in an axial direction, the different focus distance scales being respectively appropriate for use with different interchangeable lens mount units respectively mountable on said carrier tube, said focus adjusting ring having a reading window and a portion surrounding said reading window and overlying and masking all of said focus distance scales other than the one alined with said reading window, and a flange on said scale tube for engaging a surface of a lens mount unit mounted on said carrier tube to control the axial position of said scale tube, thereby to determine which one of the focus distance scales thereon is alined with said reading window.

2. A photographic camera including focus adjusting means having an optical axis and a carrier tube surrounding said optical axis and movable forwardly and rearwardly in the direction of said optical axis for focusing, an interchangeable lens mount unit engageable with and disengageable from said carrier tube and movable axially therewith, a manually movable focus adjusting ring rotatable about said optical axis as a center, a focus scale element operatively connected to said adjusting ring to rotate therewith and having a plurality of separate focusing scales marked thereon for use respectively with a plurality of interchangeable lens mount units having different focus characteristics, each of said focusing scales extending in a direction circumferentially around said optical axis, a scale masking element having a scale observation window, one of said elements being movable with respect to the other of said elements to a plurality of relative positions in each of which only one of said focusing scales is visible through said observation window, said movable one of said elements engaging said interchangeable lens mount unit and being moved thereby during positioning of said lens mount unit on said carrier tube to shift said movable one of said elements to a position rendering visible the appropriate one of said focusing scales, by the act of positioning the interchangeable lens mount unit on said carrier tube.

3. A photographic camera including focus adjusting means having an optical axis and a carrier tube surrounding said optical axis and movable forwardly and rearwardly in the direction of said optical axis for focusing, an interchangeable lens mount unit engageable with and disengageable from said carrier tube and movable axially therewith, a manually movable focus adjusting ring rotatable about said optical axis as a center, a focus scale element operatively connected to said adjusting ring to rotate therewith and having a plurality of separate focusing scales marked thereon and offset from each other in an axial direction for use respectively with a plurality of interchangeable lens mount units having different focus characteristics, each of said focusing scales extending in a direction circumferentially around said optical axis, a scale masking element having a scale observation window, one of said elements being movable in an axial direction with respect to the other of said elements to a plurality of relative positions in each of which only one of said focusing scales is visible through said observation window, spring means tending to move said movable one of said elements axially in a forward direction, said movable one of said elements engaging said interchangeable lens mount unit and being moved axially rearwardly thereby during positoning of said lens mount unit on said carrier tube to shift said movable one of said elements to a position rendering visible the appropriate one of said focusing scales, by the act of positioning the interchangeable lens mount unit on said carrier tube.

4. A photographic camera including focus adjusting means having an optical axis and a carrier tube surrounding said optical axis and movable forwardly and rearwardly in the direction of said optical axis for focusing, an interchangeable lens mount unit engageable with and disengageable from said carrier tube and movable axially therewith, a manually movable focus adjusting ring rotatable about said optical axis as a center, a focus scale element operatively connected to said adjusting ring to rotate therewith and having a plurality of separate focusing scales marked thereon and offset from each other in an axial direction for use respectively with a plurality of interchangeable lens mount units having different focus characteristics, each of said focusing scales extending in a direction circumferentially around said optical axis, said scale element being movable in an axial direction relative to said focus adjusting ring, a portion on said focus adjusting ring overlying said focusing scales and serving as a masking element to obscure portions of said focusing scales and having an observation window through which only one of the focusing scales at a time is visible, spring means tending to move said scale element axially forwardly to a position in which the rearmost one of said focusing scales is in readable alinement with said observation window, and an abutment portion on said interchangeable lens mount unit for engaging said scale element and moving said scale element axially rearwardly during a positioning movement of placing said lens mount unit on said carrier tube, to place one of said focusing scales appropriate to the particular interchangeable lens mount unit into readable alinement with said observation window.

5. A photographic camera including focus adjusting means having an optical axis and a carrier tube surrounding said optical axis and movable forwardly and rearwardly in the direction of said optical axis for focusing, an interchangeable lens mount unit engageable with and disengageable from said carrier tube and movable axially therewith, a manually movable focus adjusting ring rotatable about said optical axis as a center, a focus scale element of tubular form surrounding said optical axis coaxially therewith and operatively connected to said adjusting ring to rotate therewith and having a plurality of separate focusing scales marked thereon for use respectively with a plurality of interchangeable lens mount units having different focus characteristics, each of said focusing scales extending in a direction circumferentially around said optical axis, a scale masking element having a scale observation window, one of said elements being movable with respect to the other of said elements to a pluraltiy of relative positions in each of which only one of said focusing scales is visible through said observation window, and means engaging said movable one of said elements to tend to hold it in a position rendering visible through said observation window the one of said focusing scales which is appropriate to the particular interchangeable lens mount unit mounted on said carrier tube, the other of said focusing scales being covered and obscured by said masking element.

References Cited in the file of this patent

UNITED STATES PATENTS

| | | |
|---|---|---|
| 2,184,018 | Ort | Dec. 19, 1939 |

FOREIGN PATENTS

| | | |
|---|---|---|
| 1,095,630 | France | Dec. 22, 1954 |
| 1,122,337 | France | May 22, 1956 |

OTHER REFERENCES

"The Camera Magazine," vol. 74, No. 9, pp. 108, 109, 114.